United States Patent [19]

Havel

[11] Patent Number: 4,845,745
[45] Date of Patent: * Jul. 4, 1989

[54] DISPLAY TELEPHONE WITH TRANSDUCER

[76] Inventor: Karel Havel, P.O. Box 66, Station M, Toronto, Ontario, Canada, M6S 4T2

[*] Notice: The portion of the term of this patent subsequent to Nov. 10, 2004 has been disclaimed.

[21] Appl. No.: 155,311

[22] Filed: Feb. 12, 1988

Related U.S. Application Data

[60] Continuation-in-part of Ser. No. 931,626, Nov. 17, 1986, which is a division of Ser. No. 817,114, Jan. 8, 1986, Pat. No. 4,647,217.

[51] Int. Cl.$^4$ .............................................. H04M 1/26
[52] U.S. Cl. ..................................... 379/354; 379/396
[58] Field of Search ................. 379/110, 354, 376, 396

[56] References Cited

U.S. PATENT DOCUMENTS

| | | | |
|---|---|---|---|
| 3,924,227 | 12/1975 | Stolov | 313/510 |
| 4,705,406 | 11/1987 | Havel | 368/11 |
| 4,726,059 | 2/1988 | Havel | 379/396 |

*Primary Examiner*—Stewart J. Levy
*Assistant Examiner*—Michele Simons

[57] ABSTRACT

A telephone includes a variable color telephone display on which a dialed telephone number may be exhibited and a transducer for measuring a predetermined quantity. The color of the telephone display is controlled in accordance with the value of the measured quantity.

12 Claims, 5 Drawing Sheets

DISPLAY TELEPHONE WITH TRANSDUCER

CROSS-REFERENCE TO RELATED APPLICATIONS

This is a continuation-in-part of my copending application Ser. No. 06/931,626, filed on Nov. 17, 1986, entitled Variable Color Hybrid Display Device, which is a division of my application Ser. No. 06/817,114, filed on Jan. 8, 1986, entitled Variable Color Digital Timepiece, now U.S. Pat. No. 4,647,217, issued on Mar. 3, 1987.

Reference is also made to my copending applications Ser. No. 06/839,526, filed on Mar. 14, 1986, entitled Variable Color Display Telephone, now U.S. Pat. No. 4,726,059, issued on Feb. 16, 1988, Ser. No. 06/839,626, filed on Mar. 14, 1986, entitled Variable Color Display Typewriter, and Ser. No. 06/940,100, filed on Dec. 10, 1986, entitled Digital Voltmeter with Variable Color Background.

BACKGROUND OF THE INVENTION

1. Field of the Invention

This invention generally relates to telephones and more particularly to a display telephone with a transducer.

2. Description of the Prior Art

A telephone with monochromatic digital display disclosed in U.S. Pat. No. 3,932,709, issued on Jan. 13, 1976 to Don G. Hoff et al., has a capability to display a dialed telephone number on a monochromatic display to verify its correctness.

Variable color display telephone with a transducer is unknown.

SUMMARY OF THE INVENTION

In a broad sense, it is the principal object of this invention to provide a display telephone with a transducer.

It is another object of the invention to provide a display telephone with a variable color background.

In summary, a telephone of the invention includes a variable color telephone display on which a dialed telephone number is visually presented. The telephone also includes a transducer for measuring a predetermined quantity and for developing output electrical signals representing the measured value of the quantity. A comparator compares the measured value of the quantity with predetermined limits to develop color control signals for controlling the color of the telephone display in accordance with the measured value of the quantity.

The other objects of the invention will become apparent from the appended drawings and their description.

BRIEF DESCRIPTION OF THE DRAWINGS

In the drawings in which are shown several embodiments of the invention.

Throughout the drawings, like characters indicate like parts.

DESCRIPTION OF THE PREFERRED EMBODIMENTS

Figure 1:
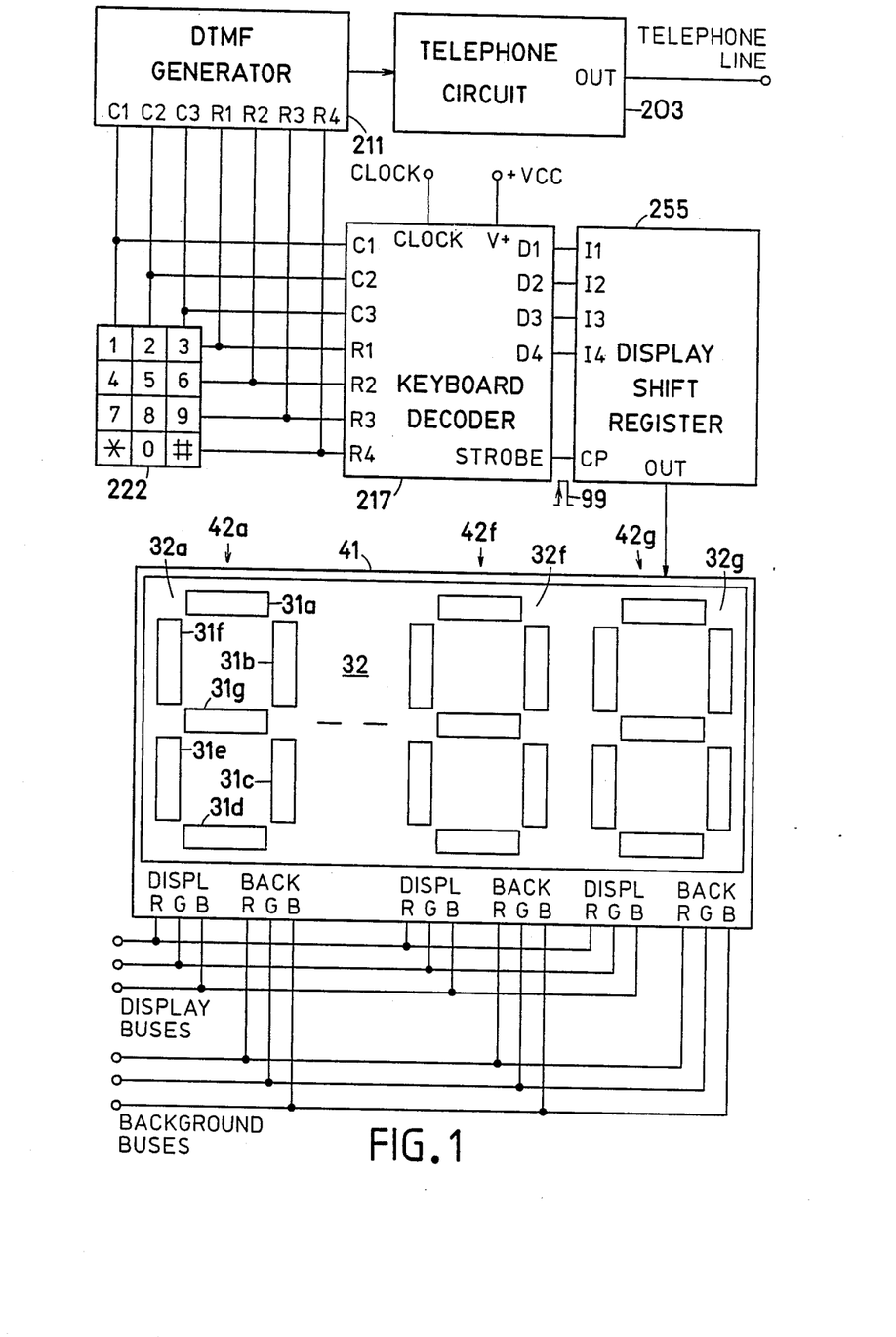
FIG. 1 is a block diagram of a display telephone with variable color background.

Referring now, more particularly, to the drawings, in FIG. 1 is shown a block diagram of a display telephone with variable color background which includes a telephone keyboard or keypad 222 having its outputs applied to a DTMF (dual-tone multifrequency) generator 211, for generating DTMF tones unique to the actuated keys, and telephone circuit 203 interfacing DTMF generator 211 to a telephone line, in a manner well understood by those skilled in the art. The telephone is additionally equipped with a keyboard decoder 217, for converting output electrical signals of keyboard 222 to a BCD (binary coded decimal) code, and display shift register 255, for serially delivering the BCD codes to a variable color telephone display 41 so that the dialed digits could be sequentially visually presented thereon.

The keyboard decoder 217 has four row inputs R1, R2, R3, and R4 and three column inputs C1, C2, and C3 connected to twelve keyswitches, arranged preferably in four rows and three columns, of keyboard 222. A periodic sequence of clock pulses of a suitable frequency is applied to the CLOCK input. When a single key of keyboard 222 is actuated, keyboard decoder 217 develops at its outputs D1, D2, D3, and D4 a binary code unique to the actuated key. A positive going strobe pulse 99 of a short duration is produced at the STROBE output when the key was actuated for at least a predetermined time, to indicate that the output code is valid.

It will be appreciated that the broken lines in telephone display 41 indicate that in reality there are seven variable color display elements 42a to 42g, of which only display elements 42a, 42f and 42g are shown. Display elements 42a, 42f, and 42g are respectively surrounded by variable color background areas 32a, 32f, and 32g, which are positioned adjacent each other to mutually define a variable color background area 32. Each display element 42a, 42f, or 42g consists of seven segments 31a, 31b, 31c, 31d, 31e, 31f, and 31g, arranged in a well known 7-segment font, on which selected characters may be exhibited in a variable color. Each display element 42a, 42f, or 42g has three color control inputs R (red), G (green), and B (blue) designated DISPL. Each background area 32a, 32f, or 32g also has three color control inputs R, G, and B designated as BACK. It is obvious from the illustration that the color control inputs of display elements 42a, 42f and 42g and background areas 32a, 32f, and 32g are respectively interconnected to form DISPLAY BUSES R, G, and B, for uniformly controlling the color of all display elements 42a, 42f, and 42g, and BACKGROUND BUSES R, G, and B, for uniformly controlling the color of background areas 32a, 32f, and 32g.

It is contemplated that the present invention is applicable to any type of a telephone device, either stationary or mobile, equipped either with a multi-frequency or pulse-dialing capability (either true or simulated one), used either in a space division or time division telephone system, and to a device for use in conjunction with a telephone, such as telephone answering system, automatic dialing system, and the like.

Figure 2:
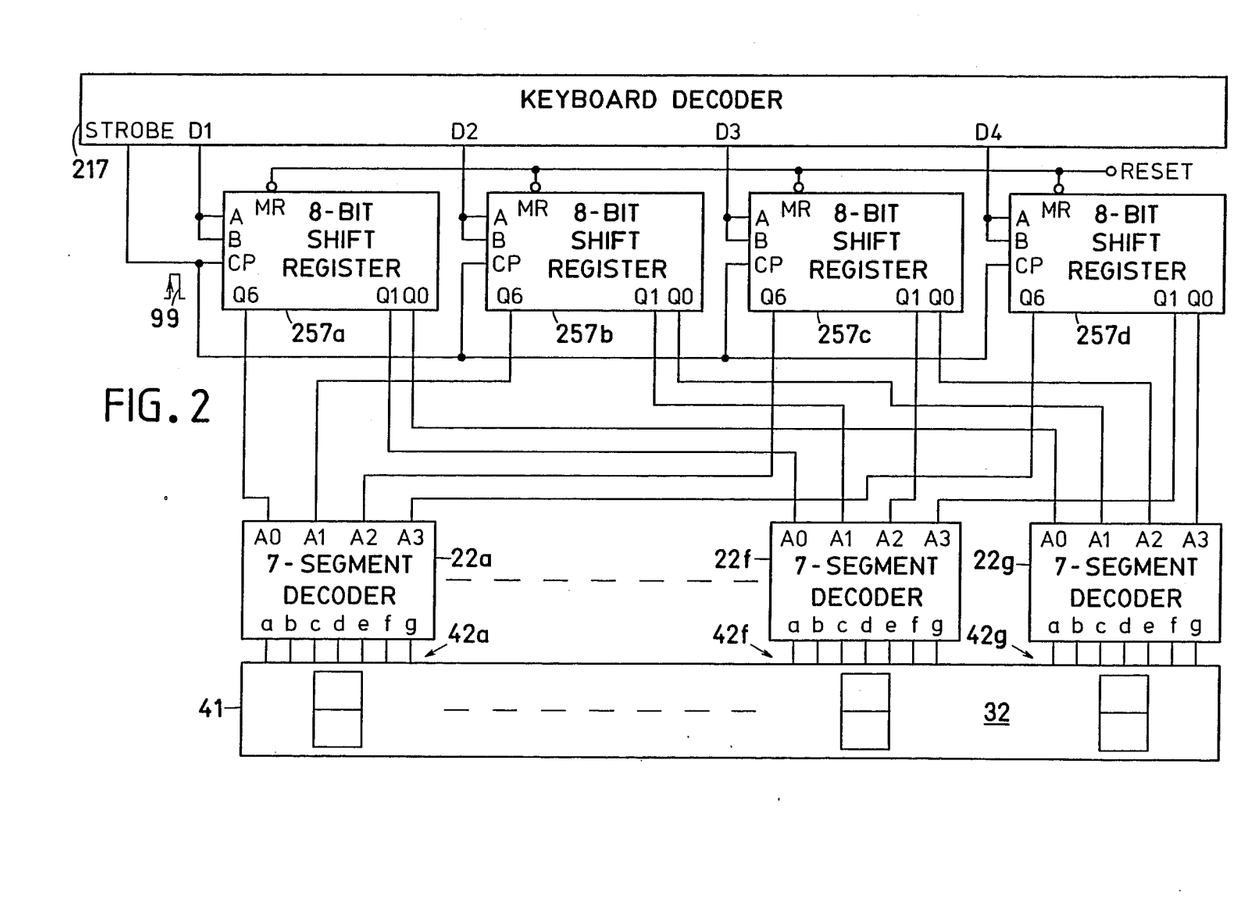
FIG. 2 is a detail of the combination of a display shift register and a telephone display of FIG. 1.

In an exemplary schematic diagram of a variable color telephone display shown in FIG. 2, the output BCD data developed at the outputs D1, D2, D3, and D4 of keyboard decoder 217, representing the instant dialed digit, are applied to respective interconnected data inputs A, B of four 8-bit shift registers 257a, 257b, 257c, and 257d. The rising edge of strobe pulse 99, which indicates that the output data of keyboard decoder 217 are valid, is applied to the interconnected Clock Pulse inputs CP for clocking the instant data into respective shift registers 257a, 257b, 257c, and 257d. It will be appreciated that the broken lines in the schematic diagram indicate that in reality there are seven 7-segment decoders 22a to 22g and seven associated variable color display elements 42a to 42g used. The outputs of shift registers 257a, 257b, 257c, and 257d are connected to seven 7-segment decoders 22a to 22g such that the least significant outputs of all shift registers 257a, 257b, 257c, and 257d are connected to inputs A0, A1, A2, and A3 of the least significant decoder 22g, and the remaining outputs of shift registers 257a, 257b, 257c, and 257d are progressively connected to inputs of successive decoders 22f to 22a, ending with the most significant outputs of the shift registers 257a, 257b, 257c, and 257d being connected to inputs of the most significant decoder 22a. It is thus obvious that the first BCD code clocked into shift registers 257a, 257b, 257c, and 257d is displayed on the least significant display element 42g. When the second dialed digit is clocked into shift registers 257a, 257b, 257c, and 257d, the first one is automatically shifted to the display element 42f, etc., until the entire dialed telephone number is displayed in a sequence on display elements 42a to 42g. The Master Reset inputs MR of all four shift registers 257a, 257b, 257c, and 257d are interconnected to the RESET terminal which must be held at at high logic level during the displaying, and may be forced to a low logic level for resetting telephone display 41 (not shown).

Figure 3:
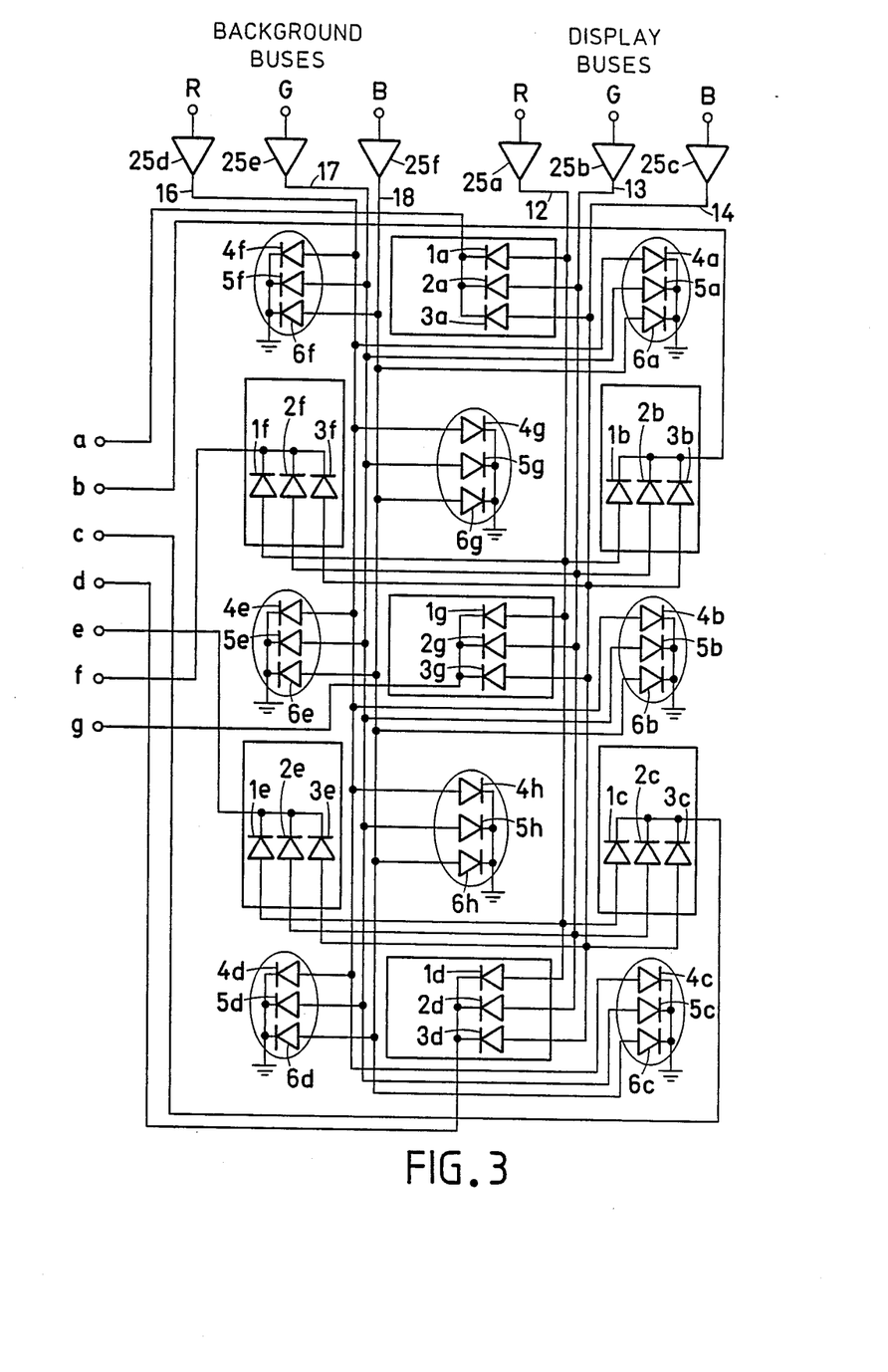
FIG. 3 is a simplified schematic diagram of one element of a display with variable color background.

Proceeding now to the detailed description, in FIG. 3 is shown a simplified schematic diagram of a one-character 7-segment variable color display element with variable color background. Each display segment of the display element includes a triad of closely adjacent LEDs: a red LED 1, green LED 2, and blue LED 3 which are adapted for producing a composite light signal of a variable color. To facilitate the illustration, the LEDs are designated by segment letters, e.g., red LED in the segment b is shown at 1b, green LED in the segment d is shown at 2d, and blue LED in the segment f is shown at 3f. The background area is comprised of background regions adjacent the display segments. Each background region includes a triad of closely adjacent LEDs: a red LED 4, green LED 5, and blue LED 6 which are adapted for producing a composite light signal of a variable color. As much as possible, the LEDs in the background regions are designated by letters of adjacent display segments.

The cathodes of all red, green, and blue display LED triads are interconnected in each display segment and electrically connected to respective inputs a, b, c, d, e, f, and g which may be coupled to like outputs a, b, c, d, e, f, and g of 7-segment decoder 22a, 22f, or 22g viewed in FIG. 2. The anodes of all display red LEDs 1a, 1b, 1c, 1d, 1e, 1f and 1g are commonly coupled to an electric path referred to as a display red bus 12. The anodes of all display green LEDs 2a, 2b, 2c, 2d, 2e, 2f, and 2g are commonly coupled to a like electric path referred to as a display green bus 13. The anodes of all display blue LEDs 3a, 3b, 3c, 3d, 3e, 3f, and 3g are commonly coupled to a like electric path referred to as as a display blue bus 14.

In a similar fashion, the anodes of all background red LEDs 4a, 4b, 4c, 4d, 4e, 4f, 4g, and 4h are commonly coupled to an electric path referred to as a background red bus 16. The anodes of all background green LEDs 5a, 5b, 5c, 5d, 5e, 5f, 5g, and 5h are commonly coupled to a like electric path referred to as a background green bus 17. The anodes of all background blue LEDs 6a, 6b, 6c, 6d, 6e, 6f, 6g, and 6h are commonly coupled to a like electric path referred to as a background blue bus 18. The cathodes of all red, green, and blue LED triads in each background region are grounded.

The display red bus 12 is connected to the output of a non-inverting buffer 25a capable of sourcing sufficient current to illuminate all display red LEDs 1a to 1g. The display green bus 13 is connected to the output of a like buffer 25b. The display blue bus 14 is connected to the output of a like buffer 25c. The background red bus 16 is connected to the output of a like buffer 25d. The background green bus 17 is connected to the output of a like buffer 25e. The background blue bus 18 is connected to the output of a like buffer 25f. It would be obvious to those skilled in the art that current limiting resistors may be connected in series with all LEDs in the circuit to constrain the current flow.

The operation of the display element shown in FIG. 3 will be now explained on example of illuminating digit '1' in yellow color. To exhibit decimal number '1', low voltage levels are applied to segment inputs b and c, to illuminate equally designated segments b and c, and high voltage levels are applied to all remaining inputs, to extinguish all remaining segments a, d, e, f, and g.

To illuminate the display element in yellow color, the color control inputs R and G of the display buses are raised to a high logic level, while color control input B is maintained at a low logic level. As a result, the outputs of buffers 25a and 25b rise to a high logic level. The current flows from the output of buffer 25a, via display red bus 12 and red LED 1b to the input b, and, via red LED 1c, to the input c. The current also flows from the output of buffer 25b, via display green bus 13 and green LED 2b, to the input b, and, via green LED 2c, to the input c. As a result of blending light signals of red and green colors in the segments b and c, the segments illuminate in substantially yellow color, creating a visual impression of a character '1'.

To illuminate the background area in green color, the color control input G of the background buses is raised to a high logic level, while the remaining color control inputs R and B are low. As a result, the output of buffer 25e rises to a high logic level. The current flows therefrom, via background green bus 17 and green LEDs 5a, 5b, 5c, 5d, 5e, 5f, 5g, and 5h in all background regions, to ground. The entire background area illuminates in green color.

To illuminate the background area in blue color, the color control input B of the background buses is raised to a high logic level, while the remaining color control inputs R and G are low. As a result, the output of buffer 25f rises to a high logic level. The current flows therefrom, via background blue bus 18 and blue LEDs 6a, 6b, 6c, 6d, 6e, 6f, 6g, and 6h in all background regions, to ground. The entire background area illuminates in blue color.

To illuminate the background area in red color, the color control input R of the background buses is raised to a high logic level, while the remaining color control inputs G and B are low. As a result, the output of buffer 25d rises to a high logic level. The current flows therefrom, via background red bus 16 and red LEDs 4a, 4b, 4c, 4d, 4e, 4f, 4g, and 4h in all background regions, to ground. The entire background area illuminates in red color.

Figure 4A:
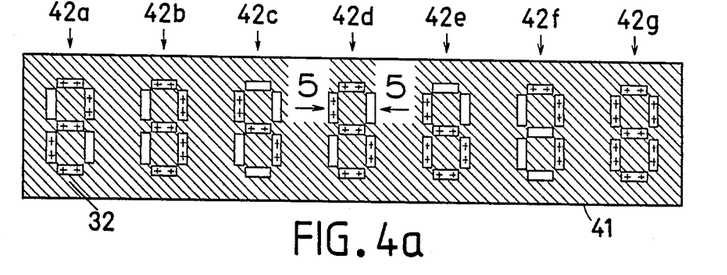
FIG. 4a is an exemplary detail of a telephone display on which the dialed telephone number is displayed in yellow color on green background.
Figure 4B:
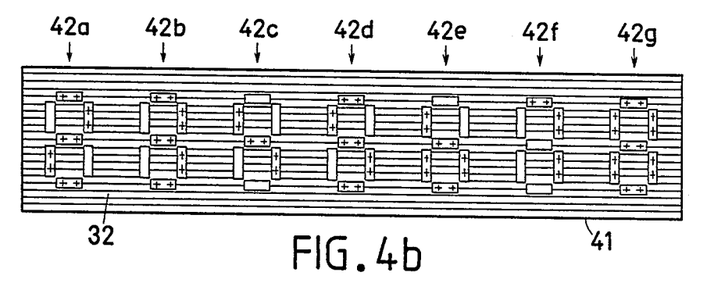
FIG. 4b is an exemplary detail of a telephone display on which the dialed telephone number is displayed in yellow color on blue background.
Figure 4C:
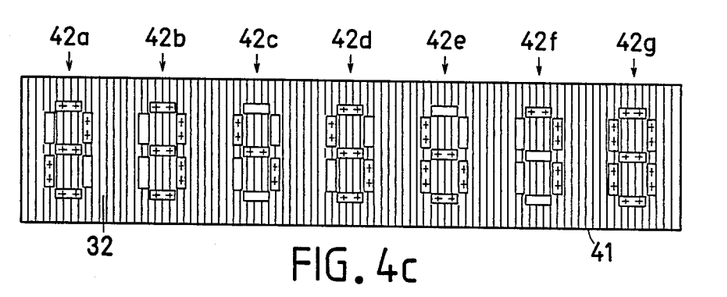
FIG. 4c is an exemplary detail of a telephone display on which the dialed telephone number is displayed in yellow color on red background.

In FIGS. 4a to 4c is shown 7-digit telephone display 41 which includes variable color display elements 42a 42b, 42c, 42d, 42e, 42f, and 42g substantially surrounded by a variable color background area 32. FIG. 4a shows an exemplary dialed telephone number 234-5678 displayed in yellow color on green background. FIG. 4b shows the same telephone number 234-5678 displayed in yellow color on blue background. FIG. 4c shows the same telephone number 234-5678 displayed in yellow color on red background.

Figure 5:
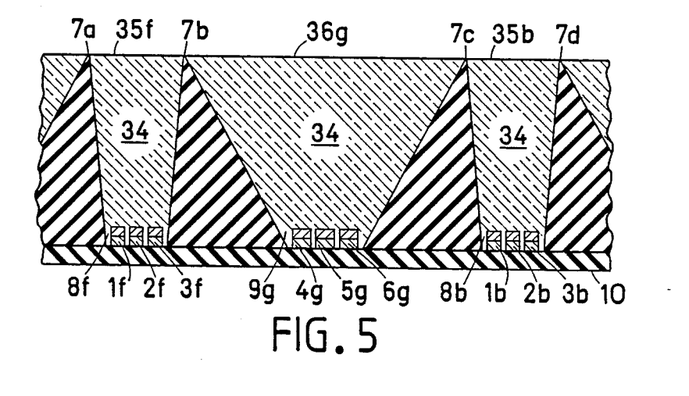
FIG. 5 is a cross-sectional view, taken along the line 5—5 in FIG. 4a revealing internal structure of a portion of a telephone display with variable color background.

An important consideration has been given to physical arrangement of the LEDs in the display areas and background regions, as illustrated in FIG. 5. Display red LED 1f, green LED 2f, and blue LED 3f are disposed on a support 10 in a display light blending cavity 8f and completely surrounded by transparent light scattering material 34. When forwardly biased, the LEDs 1f, 2f, and 3f emit light signals of red, green, and blue colors, respectively, which are blended by passing through light scattering material 34, acting to disperse the light signals, to form a composite light signal that emerges at the upper surface 35f. The color of the composite light signal may be controlled by varying the portions of red, green, and blue light signals. Display red LED 1b, green LED 2b, and blue LED 3b are similarly disposed in a display light blending cavity 8b and may be similarly activated.

In a similar fashion, background red LED 4g, green LED 5g, and blue LED 6g are disposed on the support 10 in a background light blending cavity 9g and surrounded by transparent light scattering material 34. When forwardly biased, the LEDs 4g, 5g, and 6g emit light signals of red, green, and blue colors, respectively, which are blended by passing through light scattering material 34 to form a composite light signal of a composite color that emerges at the upper surface 36g.

The display light blending cavities are optically separated from adjacent background light blending cavities by opaque walls. The display light blending cavity 8f is defined by walls 7a and 7b which have generally smooth inclined surfaces defining an obtuse angle with the support 10. The walls 7b and 7c similarly define a background light blending cavity 9g therebetween. In a similar fashion, the display light blending cavity 8b is defined by walls 7c and 7d. The width of the top surfaces of opaque walls 7a, 7b, 7c, and 7d is uniform and distinctly less than the width of the display areas or background regions so as to minimize the boundaries therebetween. The top surfaces of the opaque walls and top surfaces of the display areas and background regions are in the same plane to allow wide angle observation of the display device. Although the walls and light blending cavities are shown to be of certain shapes and dimensions, it is envisioned that they may be modified and rearranged.

Figure 6:
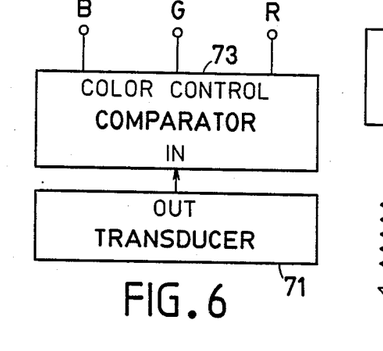
FIG. 6 is a block diagram of the combination of a transducer and a comparator.

In FIG. 6 is shown a block diagram of a transducer 71, for measuring a predetermined quantity and for developing at its output OUT electrical signals related to the measured value of the quantity, and a comparator 73, for comparing the value of the electrical signals applied to its input IN with predetermined limits and for accordingly developing color control signals B (blue), G (green), and R (red) at its color control outputs. The color control outputs B, G, and R may be respectively coupled either to color control inputs B, G, and R of the display buses of telephone display 41 viewed in FIG. 1, for controlling the color of the display indication in accordance with the value of the measured quantity, or to color control inputs B, G, and R of the background buses of telephone display 41, for controlling the color of background area 32 in accordance with the value of the measured quantity.

The term transducer is defined for the purpose of this invention as a device for performing a conversion of one type of energy to another. The principles of the invention may be applied to various displacement, motion, force, pressure, sound, flow, temperature, humidity, weight, magnetic, physiological, and like transducers. The term physiological transducer is defined as means for producing electrical signals which represent physiological conditions or events in a human body or other living matter.

Figure 7:
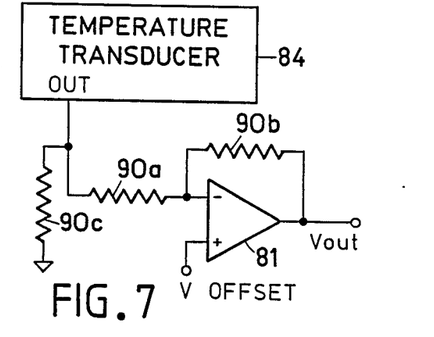
FIG. 7 is a schematic diagram of a temperature transducer with interface circuit for developing a voltage proportional to temperature.

The principles of the invention will be demonstrated by the example of a temperature transducer. In a schematic diagram shown in FIG. 7, temperature transducer 84 measures ambient temperature and develops at its output a current which is linearly proportional to measured temperature in degrees Kelvin. The current flows through resistor 90c of a suitable value (e.g., 1 k Ohm), to develop voltage proportional to the measured temperature, which is applied to the input of an op amp 81 having a feedback established by resistors 90a and 90b. To read at the output Vout of op amp 81 a voltage that directly corresponds to temperature in degrees Celsius, a DC voltage 273.2 mV is applied to the other input V OFFSET of op amp 81. The invention resides in utilizing the output voltage Vout to develop color control signals for causing telephone display 41, viewed in FIG. 1, to illuminate in a color related to measured ambient temperature. To achieve this, the terminal Vout may be directly connected to the input Vin of a comparator circuit in FIG. 8, to control the color of telephone display 41 in three steps.

Figure 8:
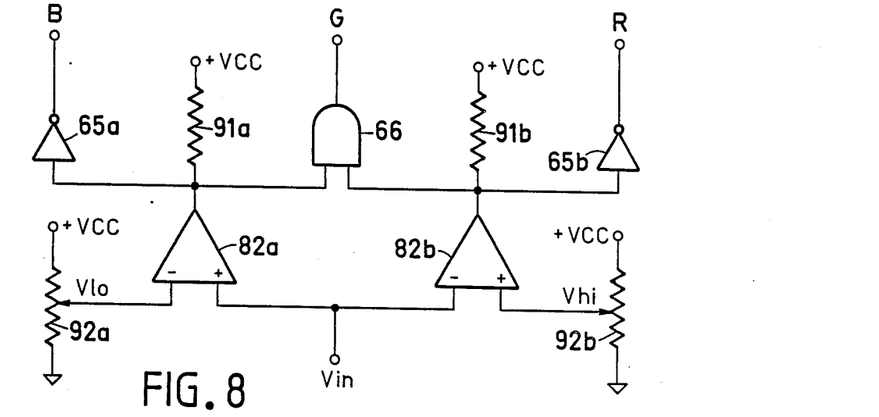
FIG. 8 is a schematic diagram of a comparator for developing three color control signals in accordance with values of an input analog voltage.

In FIG. 8, an input analog voltage Vin is applied to the interconnected inputs of two analog comparators 82a and 82b in a classic 'window' comparator configuration. When the input analog voltage Vin is lower than a predetermined low voltage limit Vlo, set by potentiometer 92a, the output of comparator 82a drops to a low logic level, thereby forcing the output of inverter 65a to rise to a high logic level to develop an active color control signal B.

When the input analog voltage Vin is higher than a predetermined high voltage limit Vhi, set by potentiometer 92b, the output of comparator 82b drops to a low logic level, thereby forcing the output of inverter 65b to rise to a high logic level to develop an active color control signal R.

When the input analog voltage Vin is between the low voltage limit Vlo and high voltage limit Vhi, the outputs of comparators 82a and 82b rise to a high logic level (pull-up resistors 91a and 91b ensure correct high and low levels), thereby causing the output of AND gate 66 to rise to a high logic level to develop an active color control signal G. The outputs B, G, and R may be respectively coupled either to inputs B, G, and R of the display buses of telephone display 41 viewed in FIG. 1, for causing the display indication to illuminate in one of three colors in accordance with the value of the input analog voltage Vin, or to inputs B, G, and R of the background buses of telephone display 41, for causing the background area 32 to illuminate in one of three colors in accordance with the value of the input analog voltage Vin.

Figure 9:
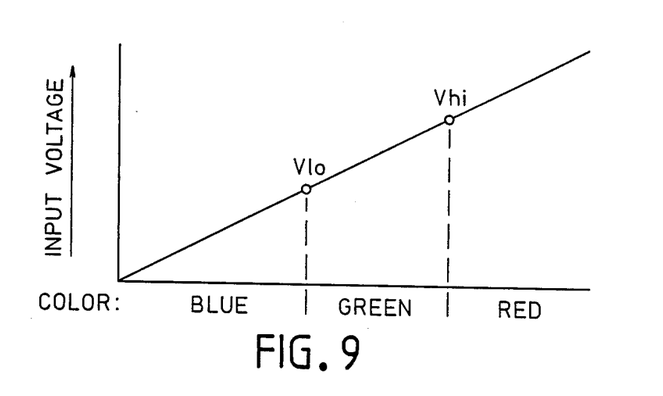
FIG. 9 is a graph depicting the relationship between values of an analog voltage and a color of the telephone display.

FIG. 9 is a graph depicting the relationship between the values of input analog voltage Vin of the comparator in FIG. 8 and the color of telephone display 41 in FIG. 1. The telephone display 41 illuminates in blue color for input analog voltage Vin being lower than the low voltage limit Vlo, in green color for input analog voltage Vin being between the low voltage limit Vlo and the high voltage limit Vhi, and in red color for input analog voltage Vin being higher than the high voltage limit Vhi.

It would be obvious that the color sequences could be readily changed by differently interconnecting the output B, G, and R of the comparator with the color control inputs B, G, and R of the display buses or background buses of telephone display 41.

The invention may be now briefly summarized. A display telephone was disclosed which includes a transducer for measuring a predetermined quantity, such as temperature, and for developing output electrical signals related to the measured values of the quantity. A comparator is provided for comparing the measured values of the quantity with predetermined limits and for accordingly developing comparison signals. Color control means illuminate either the display indication or the background area of the telephone display in a color in accordance with the comparison signals.

It would be obvious that numerous modifications can be made in the construction of the preferred embodiments shown herein, without departing from the spirit of the invention as defined in the appended claims. It is contemplated that the principles of the invention may be also applied to numerous diverse types of display devices, such are liquid crystal, plasma devices, and the like.

CORRELATION TABLE

This is a correlation table of reference characters, their descriptions, and examples of commercially available parts.

| # | DESCRIPTION | EXAMPLE |
|---|---|---|
| 1 | display red LED | |
| 2 | display green LED | |
| 3 | display blue LED | |
| 4 | background red LED | |
| 5 | background green LED | |
| 6 | background blue LED | |
| 7 | opaque wall | |
| 8 | display light blending cavity | |
| 9 | background light blending cavity | |
| 10 | support | |
| 11 | variable color display | |
| 12 | display red bus | |
| 13 | display green bus | |
| 14 | display blue bus | |
| 16 | background red bus | |
| 17 | background green bus | |
| 18 | background blue bus | |
| 22 | 7-segment decoder | |
| 25 | non-inverting buffer | 74LS244 |
| 31 | display segment | |
| 32 | variable color background area | |
| 34 | light scattering material | |
| 35 | top surface of display area | |
| 36 | top surface of background area | |
| 41 | 7-digit variable color telephone display | |
| 42 | one variable color display element | |
| 65 | inverter | 74HC04 |
| 66 | 2-input AND gate | 74HC08 |
| 71 | transducer | |
| 73 | comparator | |
| 81 | op amp | LM741 |
| 82 | analog comparator | LM339 |
| 84 | temperature transducer | AD590J |
| 90 | resistor | |
| 91 | resistor | |
| 92 | potentiometer | |
| 99 | pulse | |
| 203 | telephone circuit | |
| 211 | DTMF generator | |
| 217 | keyboard decoder | 14419 |
| 222 | telephone keyboard | |
| 255 | display shift register | |
| 257 | 8-bit shift register | 74HC164 |

What I claim is:

1. In an electronic communication terminal, the combination comprising:
   keyboard means for selectively keying characters, said keyboard means having an output indicative of the keyed characters;
   variable color display means responsive to said output for providing an indication of the keyed characters;
   means for measuring a predetermined quantity and for developing output signals related to the measured value of said quantity; and
   color control means responsive to said output signals for controlling the color of said display means in accordance with the value of said quantity.

2. The combination of claim 1 wherein said color control means control the color of the indication of the displayed characters.

3. In an electronic communication terminal, the combination comprising:
   keyboard means for selectively keying characters, said keyboard means having an output indicative of the keyed characters;
   single display means including a display area responsive to said output, for providing an indication of the keyed characters, and a variable color background area substantially surrounding said display area and having a color control input for controlling its color;
   means for measuring a predetermined quantity and for developing output signals related to the measured value of said quantity; and
   color control means responsive to said output signals for activating the color control input of said background area to control its color in accordance with the value of said quantity.

4. In an electronic communication terminal, the combination comprising:
keyboard means for selectively keying characters, said keyboard means having an output indicative of the keyed characters;
variable color display means responsive to said output for providing an indication of the keyed characters;
means for measuring a predetermined quantity and for developing output signals related to the measured value of said quantity;
comparator means for comparing said output signals with predetermined limits, to determine the range in which the measured value of said quantity lies, and for developing comparison signals accordingly: and
color control means responsive to said comparison signals for controlling the color of said indication in accordance with the range in which the measured value of said quantity lies.

5. The combination of claim 4 wherein:
said comparator means compare said output signals with predetermined low and high limits, to determine whether the measured value of said quantity is lower than said low limit, or higher than said high limit, or within the bounds of said low and high limits, and develop comparison signals accordingly; and
said color control means illuminate said indication in a first color when the measured value of said diverse quantity is lower than said low limit, in a second color when the measured value of said diverse quantity is higher than said high limit, and in a third color when the measured value of said diverse quantity is within the bounds of said low and high limits, said first, second, and third colors being respectively different.

6. A method of simultaneously indicating a dialed telephone number and a value of temperature, on a single variable color display means, by causing an indication of the dialed telephone number to be exhibited on said display means, by measuring temperature to obtain a value of temperature, and by controlling the color of said display means in accordance with the value of temperature.

7. In a telephone device, the combination comprising:
dialing means for selectively dialing a telephone number, said dialing means having an output indicative of the dialed telephone number;
variable color display means responsive to said output for providing an indication of said telephone number;
temperature transducer means for measuring temperature and for developing output electrical signals related to the measured value of temperature; and
color control means responsive to said output electrical signals for controlling the color of said display means in accordance with the value of temperature.

8. The combination of claim 7 wherein said color control means control the color of the indication of the displayed telephone number.

9. The combination of claim 7 wherein:
said temperature transducer means include comparator means for comparing the measured value of temperature with a plurality of respectively different predetermined limits, to determine the range in which the measured value of temperature lies, and for developing comparison signals accordingly; and
said color control means are responsive to said comparison signals for controlling the color of said indication such that its color corresponds to the range in which the measured value of temperature lies.

10. The combination of claim 7 wherein:
said temperature transducer means include comparator means for comparing the measured value of temperature with a predetermined low limit and a predetermined high limit, to determine whether the measured value of temperature is lower than said low limit, or higher than said high limit, or within the bounds of said low limit and said high limit, and for developing comparison signals accordingly; and
said color control means are responsive to said comparison signals for illuminating said indication in a first color when the measured value of temperature is lower than said low limit, in a second color when the measured value of temperature is higher than said high limit, and in a third color when the measured value of temperature is within the bounds of said low limit and said high limit.

11. A method of simultaneously indicating a dialed telephone number and a value of temperature, on a single variable color display means including a display area and a variable color background area substantially surrounding said display area, by causing an indication of the dialed telephone number to be exhibited on said display area, by measuring temperature to obtain a value of temperature, and by controlling the color of said background area in accordance with the value of temperature.

12. In a telephone device, the combination comprising:
dialing means for selectively dialing a telephone number, said dialing means having an output indicative of the dialed telephone number;
single display means including a display area responsive to said output, for providing an indication of the dialed telephone number, and a variable color background area substantially surrounding said display area and having a color control input for controlling its color;
means for measuring temperature and for developing output signals related to the measured value of temperature; and
color control means responsive to said output signals for activating the color control input of said background area to control its color in accordance with the value of temperature.

* * * * *